UNITED STATES PATENT OFFICE.

ASA C. CHANDLER, OF HOUSTON, TEXAS.

PROCESS OF TREATING WOOD.

1,388,513.      Specification of Letters Patent.      Patented Aug. 23, 1921.

No Drawing.      Application filed August 9, 1920. Serial No. 402,316.

*To all whom it may concern:*

Be it known that I, ASA C. CHANDLER, a citizen of the United States, residing at Houston, in the county of Harris and State of Texas, have invented certain new and useful Improvements in a Process of Treating Wood, of which the following is a specification.

This invention relates to a process of treating wood.

One object of the process is to preserve the wood to which it is applied and to protect it against fungi and boring molluscs when the timbers treated are used in marine construction.

A further feature of the invention resides in the treatment of wood with a preservative which will be much more durable and less expensive than preservatives now in common use, and will not so readily leach out as will some of the well known preservatives.

It is well known that copper salts have great value as wood preservatives, but these salts as ordinarily used are objectionable for the reason that they are highly corrosive to iron and are readily soluble in water. On account of their corrosive properties they require expensive special apparatus for application to the wood and are unsuitable for use in timbers which require iron, such as nails, bolts and the like, in erection. On account of their solubility in water they quickly leach out of the timber exposed to water. The present method of treatment consists of the injection into wood of a non-corrosive copper salt in soluble form, which is precipitated in the wood in a form which is insoluble in fresh or salt water. It is to be noted that a small percentage of copper will remain in the wood in a soluble but non-corrosive form, but this will be prevented from leaching out by reason of the fact that the pores of the wood are blocked by the bulky precipitated salt as hereinafter described. This salt will be destructive to marine boring molluscs as well as to fungus growths.

The process of treatment is as follows: The timber to be treated, if green, is given the usual preliminary treatment, that is, it is subjected to a steam bath followed by a vacuum with a result that the sap is expelled from the wood and it is ready for the absorption of the preserving fluid. The wood, after being subjected to the above described process, or if seasoned, without being subjected to said process, is then injected, under pressure, with a solution of copper carbonate in an alkaline carbonate, the pressure depending upon the kind of wood and size of timbers. The solution is prepared by adding enough copper sulfate or other copper salt to a solution of alkaline carbonate, as for example, sodium carbonate, to produce a saturated solution of the copper carbonate formed by chemical action between alkaline carbonate and the soluble copper salt.

After a sufficient amount of the fluid has been injected into the wood the remaining fluid is drained off and plain water is substituted so as to submerge the wood in the treating vat. Since copper carbonates are insoluble in water the addition of water precipitates it in a bulky amorphous form. A sufficient pressure should then be applied to cause the water to penetrate into the wood and precipitate the copper carbonate. In case the water does not penetrate sufficiently to precipitate all of the copper carbonate in the interior of the timber the unprecipitated portion will change, in the course of a few hours, into two separate substances, one, containing the greater part of the copper, crystallizing out into insoluble crystals, the other containing a portion of the copper, remaining in permanent soluble form, so that should the latter gradually leach out in spite of the blocking of the pores by the precipitate originally formed the greater part of the copper will still be retained in insoluble crystalline form.

As to the proportions of chemicals to be used a 10 per cent. solution of sodium carbonate, for instance, will dissolve approximately 0.6 per cent. copper sulfate, the latter being added in the form of a heavy aqueous solution which is vigorously stirred into the alkaline carbonate solution. The stronger the solution of alkaline carbonate the greater the percentage of copper salt that can be dissolved. The resulting copper solution is absolutely noncorrosive to metals.

What I claim is:—

1. The process of preserving wood consisting of injecting into the wood a solution of copper carbonate in an alkaline carbonate solution and then allowing the copper carbonate to precipitate in the wood.

2. The process of preserving wood consisting of injecting into the wood, under pressure, a solution of copper carbonate in an alkaline carbonate solution and then precipitating the copper carbonate in the wood by the application of water.

In testimony whereof I have signed my name to this specification in the presence of two subscribing witnesses.

ASA C. CHANDLER.

Witnesses:
R. M. SMITH,
E. V. HARDWAY.